United States Patent [19]
Pecone et al.

[11] Patent Number: 6,012,123
[45] Date of Patent: Jan. 4, 2000

[54] EXTERNAL I/O CONTROLLER SYSTEM FOR AN INDEPENDENT ACCESS PARITY DISK ARRAY

[76] Inventors: Victor Key Pecone, P.O. Box 661, Lyons, Colo. 80540; Ian R. Davies, 3950 Hawthorne Cir., Longmont, Colo. 80503

[21] Appl. No.: 08/872,019

[22] Filed: Jun. 10, 1997

[51] Int. Cl.⁷ .............................. G06F 12/08; G06F 13/20; G06F 11/10
[52] U.S. Cl. ........................... 711/114; 711/111; 711/112; 711/113; 711/154; 371/49.2; 371/51.1
[58] Field of Search .................................. 371/51.1, 49.2; 711/111, 113, 114, 112, 154; 374/57.1, 49.2

[56] References Cited

U.S. PATENT DOCUMENTS

| | | | |
|---|---|---|---|
| 5,339,322 | 8/1994 | Rastegar | 371/51.1 |
| 5,453,999 | 9/1995 | Michaelson et al. | 371/51.1 |
| 5,522,032 | 5/1996 | Franaszek et al. | 395/182.04 |
| 5,761,705 | 6/1998 | DeKoning et al. | 711/113 |
| 5,768,299 | 6/1998 | Whittaker | 371/49.2 |
| 5,778,426 | 7/1998 | DeKoning et al. | 711/114 |
| 5,787,460 | 7/1998 | Yashiro et al. | 711/114 |

*Primary Examiner*—Tuan V. Thai
*Attorney, Agent, or Firm*—Duft, Graziano & Forest, P.C.

[57] ABSTRACT

An external I/O controller system between a host system and a Redundant Array of Independent Disks (RAID) array, having a processor complex for coordinating RAID parity write operations to a member disk in a RAID array, and a cache memory complex that asynchronously executes the RAID parity write operation independent of the processor complex and any processor complex resources. The cache memory complex includes a first cache memory and a second cache memory that operate in concert to achieve increased RAID parity write efficiency for a RAID Level 3, 4, 5, or 6 write operation. The I/O controller of the present invention also performs substantially concurrent manipulations on the new host data being written to the RAID array and the old host data and old parity data used to generate a new parity data corresponding to the new host data.

15 Claims, 3 Drawing Sheets

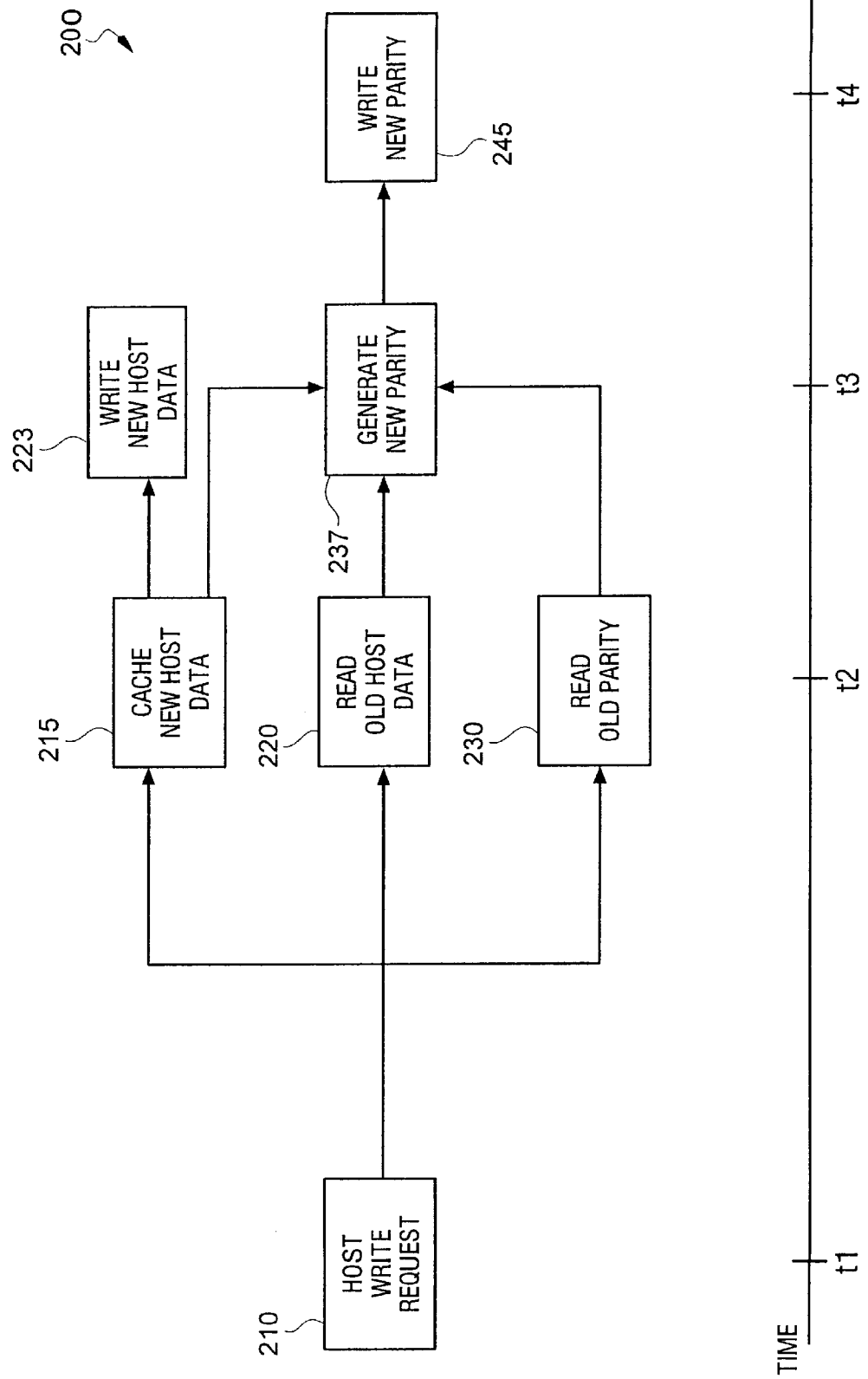

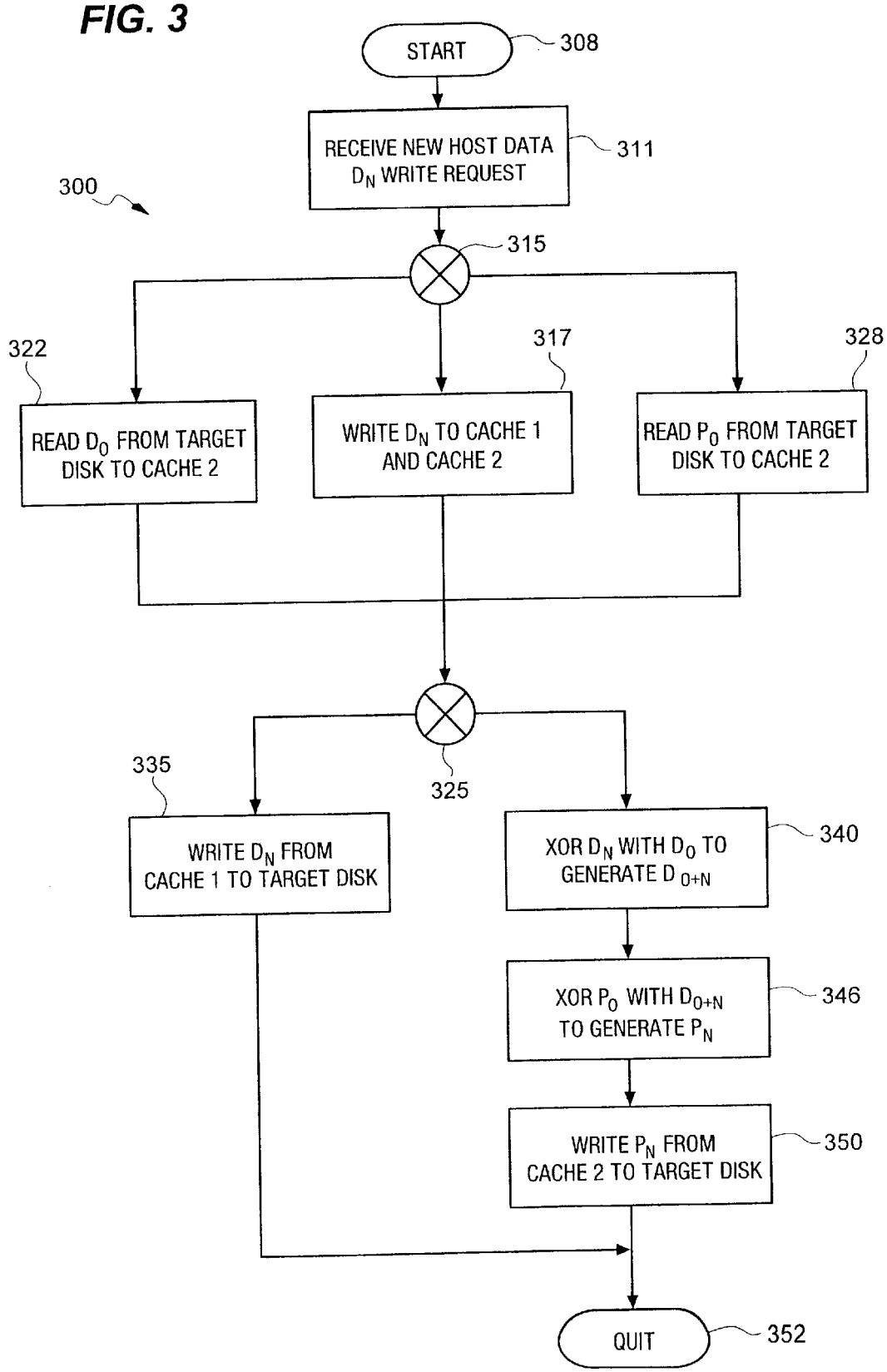

EXTERNAL I/O CONTROLLER SYSTEM FOR AN INDEPENDENT ACCESS PARITY DISK ARRAY

FIELD OF THE INVENTION

This invention relates to the field of Input/Output (I/O) controllers, and in particular to an external I/O bus controller between external I/O busses for an independent access parity disk array system, also known as a Redundant Array of Independent Disks (RAID) system.

PROBLEM

Redundant Arrays of Independent Disks (RAID) technology is well known and widely used for its desirable characteristics of cost-effective, high-performance, and high reliability data storage. RAID systems achieve these desirable characteristics by organizing multiple physical disk devices into array configurations that are each viewed by host computer applications as very large capacity virtual disks. For purposes of this discussion, a disk or disk device is a non-volatile, random access, block-addressable, multiple-write multiple-read storage device. Examples of a disk include, but are not limited to, a rotating magnetic disk and/or optical disk, or other non-volatile electronic storage element. Further, a host or host computer is a computer or computer system to which at least one disk is attached and accessible for data storage and I/O. Examples of a host computer include, but are not limited to, a mainframe computer, server, workstation, and personal computer, in addition to multiprocessors and/or computer complexes such as clusters.

One highly desirable property of any storage system is its data reliability, that is, the likelihood of data loss or data survival in the event of a failure in the array. Early RAID configurations were based on striped array and mirrored array configurations. A striped array is one that distributes application data across two or more member disks in the array in a regular pattern. However, without redundancy the striped array configuration is only as reliable as the least reliable member disk in the array. A mirrored array is one where at least two disk members maintain identical images of user data. However, maintaining identical images of user data is a reliable but extremely costly approach to achieving redundancy. For these reasons, a series of RAID levels 1 through 6 called the Berkley RAID Levels was developed to examine alternative ways to combine disks into arrays having desirable combinations of affordability, data reliability, and I/O performance. Each RAID level was stated in terms of an algorithm for mapping data blocks presented to applications onto an array's physical storage and a mechanism for providing data protection.

The RAID levels that are relevant to the present discussion include, but are not limited to, RAID levels 3 through 6. Characteristics of these RAID levels include, but are not limited to, independent access to user data, and parity. Independent access means that individual member disks in the RAID array can operate independent of each other to the extent that multiple I/O requests to the array can be serviced concurrently, versus parallel access where multiple I/O requests to the array are serviced seriatim by the array as a collective unit.

Parity in a RAID array is a redundancy mechanism to protect user data from loss due to a member disk failure. Types of Parity RAID relevant to the present discussion include distributed parity as in RAID level 5, and independent or single parity as in RAID levels 3, 4, and 6. Independent or single parity means that the blocks of user data are protected by corresponding parity data that is located on a single member disk separate from the user data. Distributed parity means that the blocks of user data are protected by corresponding parity data that are distributed across at least two other member disks separate from the user data.

The redundancy in parity RAID arrays is achieved with a bit-by-bit Exclusive-OR operation on data strips from among the member disks. For example, if a first member disk and a second member disk contain user data in a given data strip, a corresponding strip on a third member disk will contain an Exclusive-OR result of the first and second member disk strips. The Exclusive-OR function is particularly useful for parity RAID arrays because when user data cannot be retrieved due to a failure on a member disk, the location of the unreadable user data is known and can be recovered by computing the Exclusive-OR of the remaining user data from the corresponding strips of the functioning member disks. The computation is easy to perform in software or by an easy-to-implement hardware assist and makes data recovery highly reliable. Thus, the contents of any strip of data on any single one of the member disks in the array can be regenerated from the contents of the corresponding strips on the remaining disks in the array. Similarly, a given strip's contribution to the result of an Exclusive-OR result can be nullified by computing the Exclusive-OR of the result with the strip's contents.

One significant disadvantage that exists in parity RAID implementations, is asymmetrical I/O performance where read operations substantially outperform write operations. In RAID Level 5 for example where parity data is distributed across most or all member disks, a normal data read operation requires simple coordination of tasks that include selecting the member disk or disks that can satisfy the read request, scheduling and executing read requests for as many consecutively addressed strips of data as are needed, and reporting the completion of the overall read request to the host application. However, a normal write operation requires many more tasks that include: 1) reading the target data blocks and holding them in a first temporary buffer; 2) reading the corresponding parity blocks and holding them in a second temporary buffer; 3) generating a restored set of data blocks by removing the target data blocks' contribution to the parity of the corresponding parity blocks as a result of computing the Exclusive-OR of the target data blocks and the parity blocks; 4) generating updated parity blocks from the Exclusive-OR of the application data to be written and the restored set of data blocks from step 3 above; 5) writing the updated parity blocks to the parity disk; and 6) writing the application data to the appropriate target member disk. Further complicating the write operation steps stated above is where the write request maps to more than one member disk because these steps must be performed for each member disk.

To reduce or eliminate the above identified intrinsic read/write asymmetry, parity RAID implementations must be augmented by caching schemes and/or other parallel multiprocessor amendments. One solution to this performance asymmetry is to limit the use of parity RAID implementations to lite-duty read/write uses, read-intensive uses, or extremely large write operations. However, these solutions avoid the problem altogether rather than solving or otherwise improving the I/O performance asymmetry.

Another solution to the I/O performance asymmetry is to implement a non-volatile write-back cache that minimizes the I/O performance impact of momentary I/O overloads. However, this solution only addresses overload situations and not the ongoing read-modify-write cycle demands of normal use.

Another solution to the I/O performance asymmetry is to implement a volatile host data direct store to an I/O bus Central Processing Unit (CPU) memory scheme. In this scheme, there is an I/O bus bridge controller and a master CPU controller between the host system and the RAID array. The bridge controller and the master CPU controller function cooperatively to provide an I/O bus caching system in addition to the necessary processing resources to perform the read-modify-write operations for the parity RAID implementation. Here, the basic idea is that the bridge controller and the master CPU controller both read and/or manipulate the host data from the CPU's memory. Specifically, the read-modify-write operations in this scheme include: 1) the new host data $D_n$ is written to the RAID array is first written to the CPU memory; 2) the data $D_n$ is read from the CPU memory to the bridge controller memory by the bridge controller; 3) the corresponding old disk data $D_o$ is read from the appropriate RAID array disk member into the bridge controller memory and XOR'ed with the $D_n$ data to generate $D_{o+n}$ data in place of the previous $D_n$ data; 4) the old disk parity data $P_o$ is read from the appropriate RAID array member disk and XOR'ed with the $D_{o+n}$ data to generate a new parity $P_n$; 5) the $D_n$ data is written from the CPU memory to the appropriate RAID array member disk; and 6) the new parity $P_n$ data is written from the bridge controller memory to the appropriate RAID array member disk. However, this scheme is imposes an undesirably heavy burden on the CPU's processing resources by requiring multiple transactions across the CPU bus interface to the CPU memory.

For example only, the overall data throughput performance of a volatile host data direct store scheme can be shown to yield an average of only about 6.9 Mbytes/sec before subtracting performance losses due to overhead which can be significant where CPU bus arbitration holds off the CPU from the CPU memory for multiple bus transactions. This performance estimate is based on {average[(read $D_{n/bus\ memory}$)+(read $D_{n/member\ disk}$)+(read $P_n$)+(2*rmw $D/P_o$)]/number of total cycles}=Mbytes/sec. For this reason, the volatile host data direct store to an I/O bus CPU memory scheme is undesirable.

Another solution to the I/O performance asymmetry is to implement a volatile host data direct store to the I/O bus bridge controller's memory. This solution is based on the same hardware configuration and fundamental steps as discussed previously in the volatile host data direct store to a CPU memory scheme, however, additional I/O performance is realized in the bridge controller memory scheme by first writing the new host data $D_n$ directly to the bridge controller memory and then copying $D_n$ to the CPU memory. This modification to the CPU memory scheme limits CPU memory accesses to only two so that the overall data throughput, for example, is at or about 8.33 Mbytes/sec prior to subtracting overhead. Note that the throughput performance estimates discussed herein are for example purposes only to illustrate a relative performance comparison among different solutions to the I/O performance asymmetry problem.

Although the bridge controller memory scheme offers further improved performance over the CPU memory scheme, there exists a long felt need for increasingly higher performance I/O bus bridge systems that do not adversely impact transparent expandability of an I/O bus system, I/O bus bandwidth, host CPU performance, or overall system performance. Such a solution has heretofore not been known prior to the invention as disclosed and claimed below.

SOLUTION

The above identified problems are solved and an advancement achieved in the field in view of the external I/O controller system of the present invention. The external I/O controller system is used for an input/output bus between a host system and at least one data storage device in a computing system such as a typical personal computer and/or Local Area Network (LAN) computing environment.

The external I/O controller system configuration includes a processor complex having processor complex resources such as a central processing unit and a central processing unit memory. The external I/O controller system configuration also includes a cache memory complex that is operationally independent of the processor complex and includes a first cache memory and a second cache memory, wherein the first cache memory is substantially identical to but independent from the second cache memory.

Although the processor complex is the primary means for coordinating input/output operations across the cache memory complex, the processor complex plays no other role in the actual manipulation of host data or parity data toward completing the tasks of writing host data to permanent non-volatile data to a data storage device such as a RAID array using any one of the well known RAID parity data writes of Levels 3–5 or Level 6. The first cache memory and second cache memory of the cache memory complex and their corresponding cache controllers, are the primary means for operationally implementing a data parity write operation across the cache memory complex from the host system to the data storage system independent of the processor complex and/or the processor complex resources.

In a preferred embodiment, the data storage system is a Redundant Array of Independent Disks (RAID) system and the external I/O controller system is an implementation of the RAID Level 5 distributed parity read/write for independent access to a RAID disk array. Further in the preferred embodiment, the cache memory complex includes a new host data cache as the first cache memory and a parity data cache as the second cache memory.

Operationally, the cache memory complex is used during a host write operation to write new host data to the first cache memory substantially concurrently with the second cache memory. Once the old host data and the old parity data are read from the data storage system to the second cache memory, the new host data is permanently written to the data storage system from the first cache memory substantially concurrently with generating the new parity data in the second cache memory. The new parity data is based on a sequence of Exclusive-OR operations between the new host data, the old host data, and the old parity data. Once the new parity data is generated, the new parity data is also permanently written from the second cache memory to the data storage device.

BRIEF DESCRIPTION OF THE DRAWINGS

FIG. 2 illustrates a timing sequence for a write operation to an independent access distributed parity disk array; and FIG. 3 illustrates the operational steps of the external I/O controller system in flow diagram form.

DETAILED DESCRIPTION

External I/O Controller Architecture—FIG. 1

Figure 1:
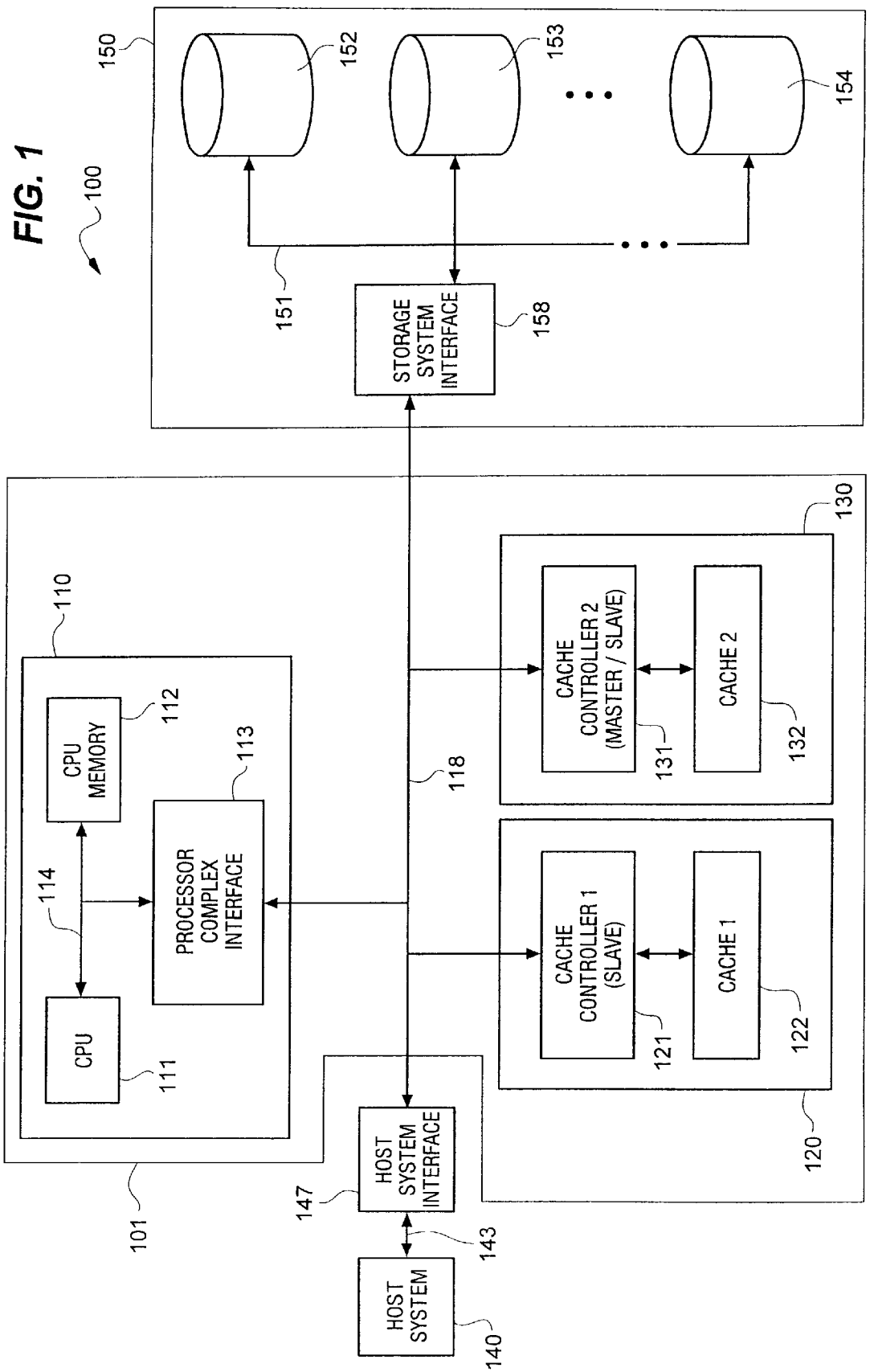
FIG. 1 illustrates a system level view of the external I/O controller system for an independent access distributed parity disk array in block diagram form.

FIG. 1 illustrates a system level block diagram view of a computing system 100 that includes an external I/O controller 101 on I/O bus 118 between a host system 140 and a high-performance peripheral data storage system 150. The host system 140 is operably connected to I/O bus 118 by way of host system interface 147 and host I/O bus 143. In the present example, the high-performance peripheral data storage system 150 includes a common storage system I/O bus 151 that interconnects one or more storage devices 152–154. The storage system 150 is operably connected to I/O bust 118 by way of storage system interface 158 and common storage system I/O bus 151.

FIG. 1 is for example purposes only and is not intended to imply any operational or architectural limitations on the external I/O controller 101 itself or the bus 118, host system 140, or data storage system 150 to which it is attached. The preferred embodiment of the external I/O bus controller 101 joins two I/O busses such as the Peripheral Component Interconnect (PCI) bus architecture commonly used in Personal Computers (PC's) in combination with Small Computer System Interface (SCSI) host systems and/or high-performance peripheral data storage systems. For purposes of the present disclosure, high-performance peripheral data storage systems include, but are not limited to, Redundant Arrays of Independent Disks (RAID) configurations. RAID refers to any of the family of methods and apparatus used for purposes including, but not limited to, managing multiple independent disks or other random access memory or partitions thereof in a manner that achieves a desired level of availability, efficiency, capacity, performance, and economic cost of storing large quantities of readily available data in a data storage system.

The primary components of the external I/O controller 101 include, but are not limited to, a processor complex 110 and a cache memory complex 120–130. Processor complex 110 includes a central processing unit (CPU) 111, a CPU memory 112, and a processor complex interface 113, operably interconnected by a CPU bus 114. The processor complex 110 is connected to the I/O bus 118 by way of processor complex interface 113.

The primary components of the cache memory complex 120–130 include, but are not limited to a first cache memory 120 and a second cache memory 130, both being operably and independently connected to I/O bus 118. The first cache memory 120 includes a cache controller 121 and a cache 122. The second cache memory 130 is substantially identical to the first cache memory 120, and includes a cache controller 131 and a cache 132. In a preferred embodiment, the first cache controller 120 is a host data cache, and the second cache controller 130 is a parity data cache. Both the first cache memory 120 and the second cache memory 130 operate in cooperation with the processor complex 110 but are operationally independent components that can manipulate data without assistance from any of the processor complex resources.

The cache memory complex is a multipurpose memory interface that primarily supports simultaneous independent and asynchronous read/write operations between the host system 140 and the data storage systems 150. In an alternative embodiment the first cache memory 120 and second cache memory 130 are substantially symmetrical in that they both have some amount of user data and parity data therein, and they both are master/slave and are balanced in their symmetry by firmware in the CPU 111.

In a preferred embodiment, the cache memory complex is used to implement a RAID Level 3,4, 5, or 6 parity write implementation. More particularly, the cache memory complex configuration is ideally used for a RAID Level 5 write operation for an independent access disk array having distributed parity. The RAID Level 5 supports the more robust Exclusive-OR (XOR) type parity that can be implemented as a more reliable alternative to existing memory shadowing techniques. In summary, the contents of any one block of data in a partition of the total data cache memory area of a RAID Level 5 implementation can be regenerated from the contents of corresponding blocks in the remaining memory area by performing an XOR of the individual strips of data around the target block. The basic XOR parity concept is well known in the data redundancy art, however, specific implementations can vary widely in terms of performance.

In one alternative embodiment, a backup power supply is attached to the first cache memory 120 and the second cache memory 130 to protect against lost data in the event of a primary power supply failure occurs. In a preferred embodiment, the backup power supply interface is non-corruptive to the data contents of the cache memory complex when it is active or during the transition between standby and/or active status.

Timing Sequence Illustration—FIG. 2

FIG. 2 illustrates a timing sequence 200 for a write operation to an independent access distributed parity disk array 150 by way of the I/O controller system 101. The timing illustration is presented to emphasize the simultaneous and/or substantially concurrent tasks that can occur between the first cache memory 120 and the second cache memory 130 during a RAID parity write operation. Key to appreciating the efficiencies that can be realized by the present invention is that three data components must be manipulated to successfully complete the write operation in a manner that is transparent to the user. The three data components include the new host data $D_n$, the old parity data $P_o$, and the old host data $D_o$.

The new host data $D_n$ is the data ultimately being written to the data storage system 150. The old host data $D_o$, if any exists, is the prior version of host data that presently resides on a permanent non-volatile medium in data storage system 150. The old parity data $P_o$ is the parity that corresponds to the old host data $D_o$. Central to the successful timing of tasks to complete a parity write is that the old parity data $P_o$ and the old host data $D_o$ must be read from the data storage system 150 before the new host data $D_n$ and corresponding new parity data $P_o$ can be permanently and safely written without risk of destroying old data or parity. Thus, it is desirable to achieve the most efficient manipulation of new and old data with the fewest resources as is disclosed below as disclosed in the general timing sequence below.

At time t1 a host write request is received 210 for processing by the 110 controller system 101 and the new host data $D_n$ that is the subject of the host write request is written 215 to the cache memory complex 120–130 at time t2. Further at time t2, the old host data $D_o$ and the old parity data $P_o$ are read, 220 and 230, from the data storage system 150 concurrently with the caching of the new host data $D_n$. The old host data $D_o$ and the old parity $P_o$ can be read concurrently with caching new host data $D_n$ because new host data $D_n$ originates from host system 140 and because the old host data $D_o$ and old parity data $P_o$ are by definition guaranteed to originate from independent members or sections of the data storage system 150.

Once the old host data $D_o$ and the old parity data $P_o$ reads are complete, the new host data $D_n$ can be permanently written 223 to data storage system 150 at time t3 concurrently with generating the new parity data $P_n$ 237. When the new parity data $P_n$ is generated, the new parity data $P_n$ can be written 245 to data storage system 150 at time t4. Note that in an alternative embodiment, additional efficiency can be realized by starting to process the data of steps 215, 220, and 230 at a time t2+ as the data is being gathered from its respective sources. However, writing the new host data $D_n$ to persistent non-volatile memory at 223 time t3 cannot occur until the old host data $D_o$ is completely read from its source at 220 time t2. Writing new host data $D_n$ before step 220 is complete can result in destroying the persistent copy of old host data $D_o$. With this timing sequence in mind, FIG. 3 illustrates the operational steps of the I/O controller system.

Operational Steps—FIG. 3

FIG. 3 illustrates the operational steps 300 of the I/O controller system in flow diagram form. The operational steps 300 begin at step 308 and proceed to step 311 where the host system's 140 request to write new host data $D_n$ to data storage system 150 is received by the I/O controller system 101. At branch point 315, several concurrent operations take place at steps 317, 322, and 328. At step 317, the new host data $D_n$ is written to the first cache memory 120 at a time substantially concurrently with the second cache memory 130. The first cache memory 120 buffers the new host data $D_n$ until it is safe to write to permanent non-volatile memory in the data storage system 150. The second cache memory 130 uses the new host data $D_n$ in its manipulations to generate the new parity data $P_n$. Concurrently with step 317, old host data $D_o$ and old parity data $P_o$ are read from data storage system 150 to the second cache memory 130 at steps 322 and 328 respectively.

Once the old host data $D_o$ and old parity data $P_o$ read is complete and the new host data $D_n$ caching is complete, processing continues at branch point 325 where additional concurrent processing occurs. At step 335, the new host data $D_n$ is written from the first cache memory 120 to permanent non-volatile memory at step 335, concurrently with generating the new parity data $P_n$ in the second cache memory 130 at steps 340–350.

At step 340, temporary host data $D_{o+n}$ is generated by an Exclusive-OR operation between the old host data $D_o$ and the new host data $D_n$. The resulting temporary host data $D_{o+n}$ is used to generate the new parity data $P_n$ by an Exclusive-OR operation between the temporary host data $D_{o+n}$ and the old parity data $P_o$ at step 346. Note that in an alternative embodiment, additional efficiency can be realized by processing available data in steps 340 and 346 "on-the-fly" as the data is being gathered among steps 317, 322, and 328.

At step 350, the resulting new parity data $P_n$ is written from the second cache memory 130 to permanent non-volatile memory in data storage system 150. The new parity data $P_n$ can be used for generating subsequent new parity data for future write operations of the corresponding host data strips. The new parity data $P_n$ may also be used for data recovery purposes in a manner that is widely known in the RAID parity data recovery of Levels 3–6. Upon completion of steps 335–350, processing for the present parity write operation is compete at step 352.

The following non-limiting example is presented to facilitate a concrete performance comparison between existing I/O controller systems and the I/O controller system of the present invention. In a computing environment such as with an I/O bus 118 between the host system 140 and the data storage system 150 for example, where the I/O bus 118 operates at or about 133 Mbytes/second and where the cache memory accesses operate at our about 80 Mbytes/second, one performance estimate for a RAID Level 5 parity write using the present invention can be at or about 11.1 Mbytes/second less overhead. This estimate is for comparative example purposes only and is based on a 40 Mbyte/second Exclusive-OR operation performed "on-the-fly" {average [(read $D_{n/host}$)+(read $D_{n/cache2}$)+(read $P_n$)+(2*rmw $D/P_o$)]/ number of total cycles}=Mbytes/seconds−overhead. That is, for a 6 cycle write operation, the average throughput is {average [(80)+(80)+(80)+(80)+(2*40)]/6}=11.1 Mbytes/second. Thus, the I/O controller of the present invention affords a significantly enhanced performance over existing I/O controllers.

SUMMARY

The external I/O controller system includes a first cache memory and a second cache memory that are operationally independent from the processor complex and can asynchronously execute the individual tasks necessary to complete a RAID parity write to a RAID array independent of the processor complex components and/or processor complex resources, in a manner that is faster and more efficient than if processor complex resources were used. Although specific embodiments are disclosed herein, it is expected that persons skilled in the art can and will make, use, and/or sell alternative external I/O controller systems that are within the scope of the following claims either literally or under the Doctrine of Equivalents.

What is claimed is:

1. An input/output controller system for an input/output bus between a host system and at least one data storage device, said input/output controller system comprising:

a processor complex having processor complex resources that include a central processing unit and a central processing unit memory;

a cache memory complex that is operationally independent of said processor complex and includes a first cache memory and a second cache memory, wherein said second cache memory is independently controlled from said first cache memory;

means for coordinating input/output operations across said cache memory complex with said processor complex; and means for operationally implementing a data parity write operation across said cache memory complex from said host system to said at least one data storage device independent of said processor complex and said processor complex resources, said means for operationally implementing including:

means for writing new host data to said first cache memory and said second cache memory;

means for generating new parity data in said second cache memory for said new host data;

means for writing by a first cache controller said new host data from said first cache memory to said at least one data storage device at a time concurrent with generation of new parity data in said second cache memory; and means for writing by a second cache controller said new parity data from said second cache memory to said at least one data storage device.

2. The system of claim 1, wherein said at least one data storage device is a Redundant Array of Independent Disks.

3. The system of claim 1, wherein said cache memory complex includes: a new host data cache as said first cache memory; and a parity data cache as said second cache memory.

4. The system of claim 3, including: first controlling means for said new host data cache; and second controlling means for said parity data cache.

5. The system of claim 1, wherein said means for coordinating includes:

means for receiving data read requests and data write requests from said host system;

means for scheduling execution of said data read requests and said data write requests received from said host system; and means for monitoring execution of said data read requests and said data write requests by said cache memory complex.

6. The system of claim 1, wherein said means for operationally implementing is a Redundant Array of Independent Disk parity data implementation selected from at least one of a group comprised of: a Level 3 RAID, a Level 4 RAID, a Level 5 RAID, and a Level 6 RAID.

7. A method in an input/output controller system for an input/output bus between a host system and at least one data storage device, said input/output controller system having a processor complex and a cache memory complex, said processor complex having processor complex resources that include a central processing unit and a central processing unit memory, said cache memory complex being operationally independent of said processor complex and having a first cache memory and a second cache memory, wherein said second cache memory is independently controlled from said first cache memory, said method comprising:

coordinating input/output operations across said cache memory complex by way of said processor complex;

operationally implementing a data parity write operation across said cache memory complex from said host system to said at least one data storage device independent of said processor complex and said processor complex resource, wherein said operationally implementing step includes:

writing new host data to said first cache memory and said second cache memory;

writing said new host data from said first cache memory to said at least one data storage device by a first cache controller;

generating new parity data in said second cache memory for said new host data at a time concurrent with the step of writing said new host data from said from said first cache memory to said at least one data storage device; and writing said new parity data from said second cache memory to said at least one data storage device by a second cache controller.

8. The method of claim 7, wherein said step of coordinating includes:

receiving a data write request from said host system;

scheduling execution of said data write request from said host system; and monitoring execution of said data write request by said cache memory complex.

9. The method of claim 7, wherein said step of executing includes:

gathering new host data, old host data, and old parity data into said cache memory complex; and generating said new parity data for said new host data at a time concurrently with said step of gathering.

10. The method of claim 9, wherein said step of generating includes:

reading old host data from said at least one data storage device to said second cache memory wherein said new host data is an updated set of data that corresponds to said old host data;

reading old parity data from said at least one data storage device to said second cache memory at a time concurrently with said step of reading said old host data wherein said new parity data is an updated set of data that corresponds to said old parity data;

generating a first Exclusive-OR result in said second cache memory from an Exclusive-OR operation of said old host data and said new host data; and generating said new parity data in said second cache memory from an Exclusive-OR operation of said old parity data and said first Exclusive-OR result.

11. The method of claim 7, wherein said step of executing includes:

gathering new host data, old host data, and old parity data into said code memory complex at a concurrent time; and executing said steps of generating and writing after said step of gathering is complete.

12. A Redundant Array of Independent Disks (RAID) controller system on an input/output bus between a host system and at least one data storage device in a RAID array, said RAID controller system having a processor complex and a cache memory complex, said processor complex having processor complex resources that include a central processing unit and a central processing unit memory, said RAID controller system comprising:

said cache memory complex being operationally independent of said processor complex and having a first cache controlled by a first cache controller and a second cache controlled by a second cache controller, wherein said second cache is independently controlled from said first cache and said first cache controller;

means for executing a RAID parity write operation across said cache memory complex from said host system to said RAID array absent any host data manipulation and parity data manipulation with said processor complex resources, said means for executing said RAID parity write operation including:

means for writing new host data to said first cache and said second cache;

means for writing said new host data from said first cache to said at least one data storage device by said first cache controller;

means for generating new parity data in said second cache for said new host data at a time concurrent with the writing of said new host data from said first cache to said at least one data storage device; and means for writing said new parity data from said second cache to said at least one data storage device by said second cache controller.

13. The system of claim 12, wherein said means for means for executing includes:

means for receiving a data write request from said host system;

means for scheduling execution of said data write request from said host system; and means for monitoring execution of said data write request by said cache memory complex.

14. The system of claim 13, including:

means for writing said new host data to said first cache and said second cache; and means for generating new parity data for said new host data in said second cache.

15. The system of claim 14, wherein said means for generating includes:

means for reading old host data from said at least one data storage device to said second cache wherein said new host data is an updated set of data that corresponds to said old host data;

means for reading old parity data from said at least one data storage device to said second cache at a time concurrently with said step of reading said old host data wherein said new parity data is an updated set of data that corresponds to said old parity data;

means for generating a first Exclusive-OR result in said second cache from an Exclusive-OR operation of said old host data and said new host data; and means for generating said new parity data in said second cache from an Exclusive-OR operation of said old parity data and said first Exclusive-OR result.

* * * * *

UNITED STATES PATENT AND TRADEMARK OFFICE
CERTIFICATE OF CORRECTION

PATENT NO. : 6,012,123
DATED : January 4, 2000
INVENTOR(S) : Victor Key Pecone, et. al.

It is certified that error appears in the above-identified patent and that said Letters Patent is hereby corrected as shown below:

Title page, insert item[73], Assignee: To read as following: Adaptec,Inc.

Signed and Sealed this

Fourth Day of July, 2000

Attest:

Q. TODD DICKINSON

Attesting Officer

Director of Patents and Trademarks